United States Patent
Robin et al.

(10) Patent No.: US 10,480,972 B2
(45) Date of Patent: Nov. 19, 2019

(54) METHOD FOR CONTROLLING AN APPARATUS FOR ULTRASONICALLY MEASURING THE FLOW RATE OF A FLUID IN A MEASURING CHANNEL

(71) Applicants: EFS SA, Montagny (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON 1, Villeurbanne (FR); INSTITUT NATIONAL des SCIENCES APPLIQUEES DE LYON, Villeurbanne (FR)

(72) Inventors: Julian Robin, Lyons (FR); Pascal Gucher, St Genis les Ollieres (FR); Alexandre Huchon, Soucieu en Jarrest (FR); Sébastien Ollivier, Lyons (FR); Philippe Blanc-Benon, Lyons (FR)

(73) Assignees: EFS SA, Montagny (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON 1, Villeurbanne (FR); INSTITUT NATIONAL des SCIENCES APPLIQUEES DE LYON, Villeurbanne (FR)

( * ) Notice: Subject to any disclaimer, the term of this patent is extended or adjusted under 35 U.S.C. 154(b) by 0 days.

(21) Appl. No.: 15/949,999

(22) Filed: Apr. 10, 2018

(65) Prior Publication Data

US 2018/0292245 A1     Oct. 11, 2018

(30) Foreign Application Priority Data

Apr. 10, 2017   (FR) .................................. 17 53114

(51) Int. Cl.
| | |
|---|---|
| G01F 1/66 | (2006.01) |
| G01F 1/712 | (2006.01) |
| H04Q 9/00 | (2006.01) |

(52) U.S. Cl.
CPC ................ *G01F 1/667* (2013.01); *G01F 1/66* (2013.01); *G01F 1/662* (2013.01); *G01F 1/712* (2013.01); *H04Q 9/00* (2013.01)

(58) Field of Classification Search
CPC ........................................................ G01F 1/66
See application file for complete search history.

(56) References Cited

U.S. PATENT DOCUMENTS

| | | |
|---|---|---|
| 4,325,262 A | 4/1982 | Meisser et al. |
| 5,583,301 A | 12/1996 | Strauss et al. |

(Continued)

*Primary Examiner* — Jewel V Dowtin
(74) *Attorney, Agent, or Firm* — Cantor Colurn LLP

(57) ABSTRACT

A control method for an apparatus for ultrasonically measuring the flow rate of a fluid in a measuring channel, including a measuring channel whose one end is equipped with a first transducer and the other end is equipped with a second transducer, each transducer emitting ultrasonic waves to the other transducer, and receiving waves generated by the other transducer, where, in a first step, the first transducer emits waves to the second transducer, and in a second step, which can be simultaneous with the first one, the second transducer emits waves prior to the reception of the waves emitted by the first transducer.

10 Claims, 2 Drawing Sheets

(56) References Cited

U.S. PATENT DOCUMENTS

| | | |
|---|---|---|
| 7,231,468 B2 | 6/2007 | Cline |
| 7,254,494 B2 * | 8/2007 | Botter .................... G01F 1/667 |
| | | 702/48 |
| 7,673,527 B2 | 3/2010 | Ehring et al. |
| 7,703,337 B1 | 4/2010 | Feller |
| 7,775,125 B2 * | 8/2010 | Rhodes .................... G01F 1/66 |
| | | 73/861.27 |
| 9,267,829 B2 * | 2/2016 | Chevrier ................ G01F 1/667 |
| 10,036,763 B2 * | 7/2018 | Hies ....................... G01P 5/244 |
| 2010/0095782 A1 * | 4/2010 | Ferencz ................... G01F 1/66 |
| | | 73/861.28 |
| 2014/0345390 A1 | 11/2014 | Gottlieb et al. |
| 2017/0227568 A1 * | 8/2017 | Hies ....................... G01P 5/245 |
| 2018/0299306 A1 * | 10/2018 | Robin .................... G01F 1/667 |

* cited by examiner

METHOD FOR CONTROLLING AN APPARATUS FOR ULTRASONICALLY MEASURING THE FLOW RATE OF A FLUID IN A MEASURING CHANNEL

CROSS REFERENCE TO RELATED APPLICATION

This application is related to and claims the benefit of French Patent Application Number 17/53114 filed on Apr. 10, 2017, the contents of which are herein incorporated by reference in their entirety.

Technical Field

The disclosure concerns a control method for an apparatus for ultrasonically measuring the flow rate of a fluid in a measuring channel, as well as a control system implementing such a control method.

Background

The flow rate of a fluid in a pipe can be measured by means of an ultrasonic flowmeter, according to the method for measuring the difference in transit times. This means is now widespread thanks to the progress of electronics which allow measuring time intervals with high resolution.

A type of known ultrasonic flowmeter, presented in particular by the document US-A1-20140345390, includes a fluid passage cylinder comprising at each end an inlet or an outlet of the fluid flowing into a direction perpendicular to this cylinder.

Each end of the fluid passage cylinder has a closure face perpendicular to this cylinder, receiving, at the outside on one side an ultrasonic emitter, and on the other side a receiver receiving the waves emitted by the emitter.

The cylinder further includes a tube fitted inside, presenting an axial perforation forming a channel receiving the flow rate of the fluid as well as the ultrasonic wave sent by the emitter. The tube made of an ultrasound-absorbing material, such as a polymer, achieves an attenuation of the propagation of the sound waves scattering on the sides of the channel, in order to avoid parasitic propagations of the signal resulting in a noise on the receiver in addition to the relevant signal transmitted only by the fluid, which is expected by the receiver.

To the propagation velocity of the sound signal in the fluid, is added the fluid velocity resulting in a small variation in the time interval between the emission by the emitter and the reception by the receiver, which is measured. Knowing moreover the characteristics of the fluid and the geometry of this fluid passage, a fluid velocity as well as the volume flow rate are deduced.

The method for measuring the difference in transit times performs an emission by a first transducer then a measurement of the time interval for the reception of the signal by the second one, and then an emission by the second transducer and then a measurement of the time interval for the reception of the signal by the first one.

Calculating the difference between these two measurements allows evaluating a velocity of the fluid in the channel, and therefore the flow rate, with a good accuracy depending little on the pressure and temperature conditions of the fluid, since they are close during propagation of the waves in the direction of the co-current flow, then just after in the opposite direction against the current.

This method requires an electronic control system including only one path for receiving the signals, used successively for one transducer or the other.

However, for some applications with highly transient flows, the time taken for operations comprising each time an emission and a reception, repeated successively one after the other, may give an insufficient sampling frequency. In addition, these two successive operations may include variations in the pressure and temperature conditions from one operation to the other, coming from the strong dynamics, which are sufficient to introduce a part of error in the measurement of the flow rate.

Particularly, in order to follow measurements of flow rates and therefore of volumes injected in a gasoline heat engine, with very short injection times including for each injection a rise of the flow rate and then a decrease for going down to zero, the accuracy may be insufficient.

BRIEF SUMMARY

The present disclosure aims in particular to avoid these drawbacks of the prior art, particularly by synchronizing ultrasonic propagations and by increasing the sampling frequencies of the co-current and counter-current transit times.

The disclosure provides to this end a control method for an apparatus for ultrasonically measuring the flow rate of a fluid in a measuring channel, including a measuring channel whose one end is equipped with a first transducer and the other end is equipped with a second transducer, each transducer emitting ultrasonic waves to the other transducer, and receiving waves generated by the other transducer, this method being remarkable in that in a first step, the first transducer emits waves to the second transducer, and in a second step, which can be simultaneous with the first one, the second transducer emits waves prior to the reception of the waves emitted by the first transducer.

An advantage of this control method is that, by performing the signal emissions in parallel for both transducers, with a control system also allowing in parallel the processing of the receptions of the two transducers, we can reduce the error due to deviations in the propagation conditions compared to a method performing the emission by a transducer only after the reception of the signals coming from the other transducer.

In this manner, characteristics of the remaining fluid are obtained, remaining substantially constant during the propagation of the two waves at the same time, which allows following with an improved accuracy the rapid dynamic transitions of a fluid flowing.

The ultrasonic measuring apparatus according to the embodiments of the disclosure may further include one or more of the following characteristics, which may be combined together.

Advantageously, the first step and the second step of the control method are carried out iteratively.

According to one embodiment, each transducer performs emissions of waves in a non-synchronized manner relative to the other transducer.

Alternatively, each transducer may perform emissions of waves in a synchronized manner relative to the other transducer.

The disclosure provides a system for controlling an apparatus for ultrasonically measuring the flow rate of a fluid, including means implementing a control method comprising any one of the previous characteristics.

Advantageously, the control system includes a common path for emitting the energizing signals for both transducers. The common path delivered to a multiplexer allows simplifying this control system.

Advantageously, the control system includes a path for emitting pulse signals, comprising a generator generating these signals transmitted to an impedance matching circuit placed before or after a multiplexer connected to the transducers.

Advantageously, the control system includes at least two distinct reception paths.

In this case, each reception path may successively include an impedance matching circuit, and then a signal conditioning device comprising a band-pass filter and an amplifier.

In addition, each reception path may then include a module for detecting the arrival of the wave delivering a processed signal, and then a logic circuit validating the arrival time of the wave.

BRIEF DESCRIPTION OF THE DRAWINGS

Other characteristics and advantages will become apparent upon reading the following description, given solely by way of example, with reference to following figures.

DETAILED DESCRIPTION

Figure 1:
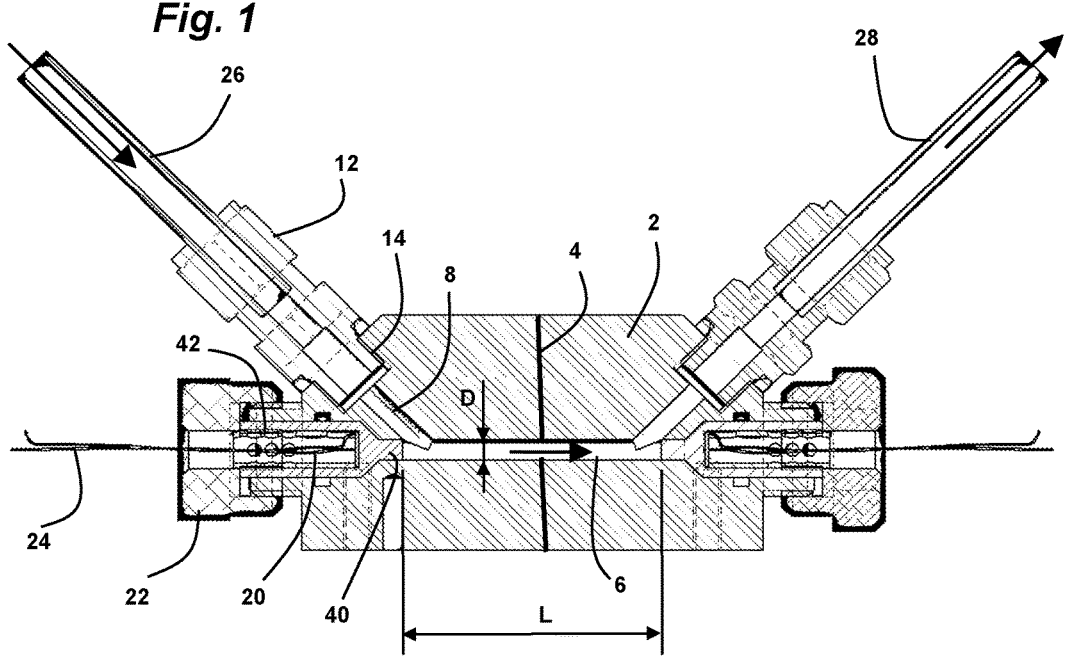
FIG. 1 is an axial section of an ultrasonic measuring apparatus, including two transducers each capable of emission and reception.
Figure 2:
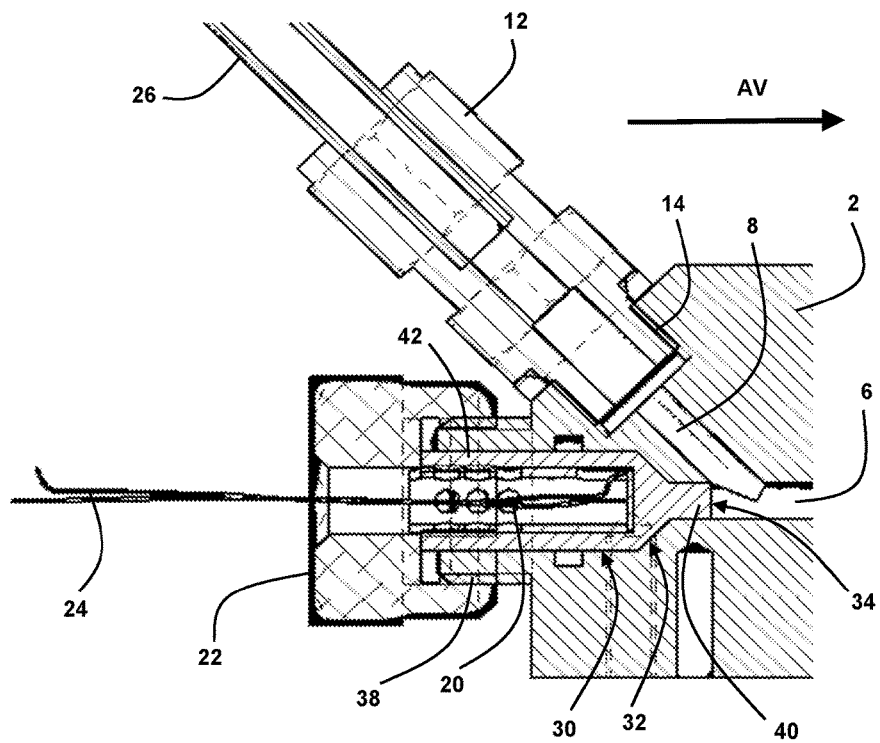
FIG. 2 is a detailed view of this measuring apparatus presenting a transducer.

FIGS. 1 and 2 show an ultrasonic measuring apparatus including a body 2 comprising a rectilinear measuring channel 6 disposed along a longitudinal axis, connected to supply perforations 8, comprising, on one side, an inlet perforation and an upstream transducer 20 and, on the other side, an outlet perforation and a downstream transducer.

Conventionally, the front face of each transducer 20 is defined according to its axis, such as the face facing the channel 6, emitting or receiving the ultrasounds.

Each supply perforation 8 receives a metal fitting 12 screwed by a thread 14 on the body 2, holding an inlet pipe 26 or an outlet pipe 28 disposed in the axis of this perforation.

Each end of the channel 6 receives a piezoelectric transducer 20 forming a cylinder disposed along the axis of this channel, inserted from the rear into a cylindrical cavity of a shell 42 held by a rear tightening nut 22. The transducer 20 includes power supply wires 24 coming out from the rear, along its axis.

Each end of the channel 6 is extended by a cavity opening toward the outside of the body 2, including, starting from the outside, a large-diameter bore, then a conical surface centered on the narrowing axis, presenting an opening angle of 90°, and finally the perforation of the channel presenting a constant diameter D.

Each transducer shell 42 presents, starting from the rear, a cylindrical shape 30 fitted into the large-diameter bore of the end cavity of the channel 6, and then a conical constriction 32 fitted on the conical surface of this cavity, which bears on this surface by the tightening of the rear nut 22.

The transducer shell 42 finally presents a cylindrical stud fitting into the perforation of the channel 6, forming a waveguide 40 which ends with a front transverse face 34 disposed just before the supply perforation 8. The transducer shell 42 is made of a material whose behavior in transmission of ultrasounds and behavior in pressure and temperature are known.

The waveguide 40 constitutes a portion filling the end of the measuring channel 6, located ahead of the conical constriction 32, which extends up to the branch between this channel and the supply perforation 8. Thus, there is no recessed area of the fluid in the measuring channel 6, which would reduce the reliability of the measurement.

The transducers 20 have a piezoelectric ceramic which is the element converting the electrical voltages into vibrations, or vice versa, presenting a diameter greater than the diameter D of the measuring channel. Thus, the wave useful to the measurement emitted by a transducer 20, passing through the waveguide 40 and then exiting from the front transverse face 34 of this waveguide, is parallel to the axis of the measuring channel 6, so as to propagate along this channel toward the opposite transducer.

In addition, the conical constriction 32 of the front portion of each transducer shell 42, presents an angle with respect to a transverse plane of 45° which allows refracting the parasitic ultrasonic waves emitted by the transducer on the sides of the front waveguide 40. In general, the opening angle of the conical surface receiving the conical constriction 32 can be comprised between 60 and 120°.

In this manner, we reduce the forward propagation of the ultrasonic waves in the solid of the body 2 of the apparatus, which would reach the opposite transducer 20, in order to avoid sending parasitic waves thereto that would be added to those transiting into the fluid of the measuring channel 6.

The body 2 of the measuring apparatus includes at each end of the channel 6 a circular boss centered on the axis of this channel, extending this body rearwards, having an external thread 38.

The control method for a flowmeter including two transducers 20 that can both emit and receive ultrasounds, consists in measuring the propagation times of an ultrasonic signal in a flowing of the fluid, when this signal is emitted co-currently in the flow direction, and counter-currently in the opposite direction.

For this, the upstream transducer emitting a co-current wave, which is received by the downstream transducer is energized, and the downstream transducer emitting a counter-current wave, which is received by the upstream transducer is energized. Thus, each transducer alternately switches from an emission state to a reception state.

The difference between the two transit times of the wave allows, since the distance between the two transducers is known, to determine the flowing velocity of the fluid depending on the physical characteristics thereof, mainly pressure and temperature, as well as density and compressibility of the fluid. The geometry of the duct then allows calculating the volume flow rate of the flowing.

The control method applies to all types of measuring apparatuses including two transducers 20 that can emit and receive, without being limited to the measuring apparatus presented above, given only by way of example.

Figure 3:
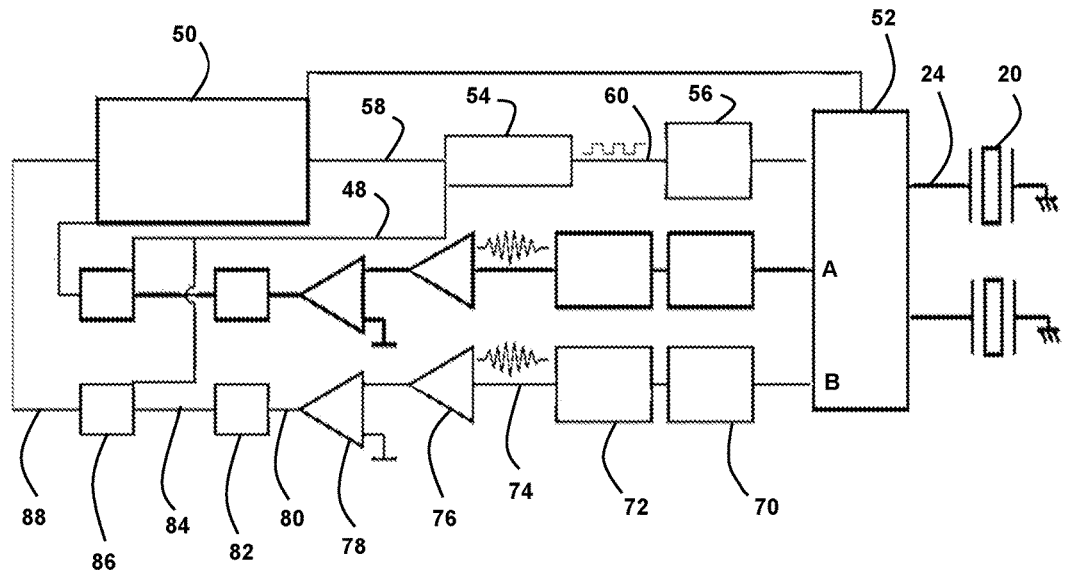
FIG. 3 presents an electronic diagram of a control system for this measuring apparatus, implementing the method according to an embodiment of the invention.
Figure 4:
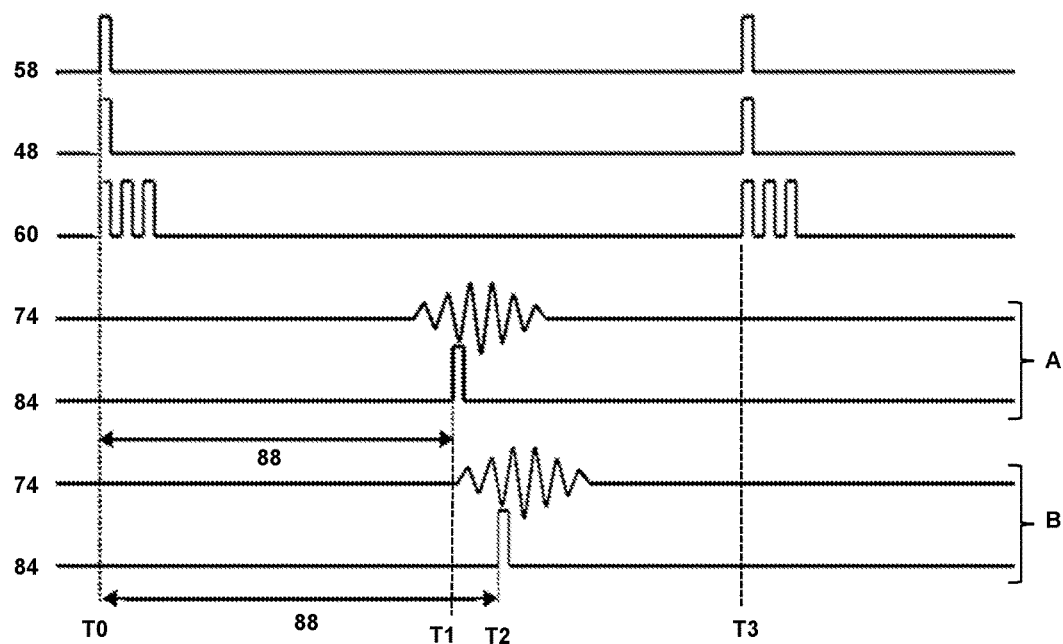
FIG. 4 is a graph presenting, as a function of time, the operation of this control system.

FIGS. 3 and 4 show a control system including a single common emission path for the two transducers 20, establishing the two signals 48, 60 schematically at the top of the graph in FIG. 4.

The control system includes two reception paths A and B each attached to a transducer through the multiplexer 52.

Each reception path A, B processes the signals emitted by its transducer 20, and establishes schematized signals 74, 84 for each of these paths, at the bottom of the graph in FIG. 4.

The control system includes a processor 50 sending information to a multiplexer 52, which is connected to the two transducers 20 each including a looping of the electric circuit by the ground of the apparatus.

The common emission path for the two transducers 20 includes a pulse generator 54 generating emitted energizing signals 60 comprising a succession of slots, from a trigger signal 58 given by the processor 50, at time T0 shown on the graph in FIG. 4. The emitted energizing signals 60 are transmitted to an emission impedance matching circuit 56, and then to the multiplexer 52.

The emitted energizing signals 60 start at time T0. At the same time, the pulse generator 54 delivers a start signal 48 to a time interval measuring module 86 (also called «TIMM»), disposed on each reception path A, B.

The multiplexer 52 transmits the energizing signals to each transducer 20, so that they emit ultrasonic waves corresponding to these signals in the measuring channel of the apparatus 6 comprising the flow rate of the fluid to be measured, to the opposite transducer.

Each reception path A, B includes, starting from the multiplexer 52, a reception impedance matching circuit 70, and then a signal conditioning device comprising first a band-pass filter 72 delivering a received pulse signal 74. The signal conditioning device includes then an amplifier 76, and then a set of modules 78 for detecting the arrival of the wave which delivers a processed signal 80.

For each path A, B, the processed signal 80 is transmitted to a programmable logic device 82 (also called «PLD»), including a program validating the reception time 84 which is delivered at time T1 for the path A and at time T2 for the path B.

In addition, the detection of the analog threshold may include a servo-control of the voltage of the emission signal, or of the detection threshold, in order to avoid errors coming from the amplitude variation of the received pulse signal 74.

For each path A, B, the indication of the reception time 84 is transmitted to the time interval measuring module 86 which, from the start signal 48 delivered by the pulse generator 54, calculates the corresponding time interval 88 which is delivered to the processor 50.

It will be noted that the time interval 88 ending at time T1 for the first reception path A processing the signal received from the transducer disposed downstream of the flow, is different from the time interval ending at time T2 for the second reception path B processing the signal received from the transducer disposed upstream, because of the flowing velocity carrying the ultrasonic wave which reduces the travel time for the first path and increases it for the second one.

The processor 50 receiving both time intervals 88 of the two paths A, B then calculates the flowing velocity and deduces therefrom the corresponding flow rate.

A new cycle of emitting energizing signals 60 on each transducer 20 is afterwards undertaken at time T3.

Advantageously, the emissions of energizing signals 60 on each transducer 20 are made independently of one another, in a non-synchronized manner. Particularly, it is possible for each transducer 20 to proceed to a new emission of energizing signal emission 60, immediately upon the reception of the signals coming from the other transducer. In this manner, the sampling frequency is increased.

In addition, the control system may include means for compensating the error induced by the temperature or the pressure of the fluid discharging into the measuring apparatus, using temperature or pressure sensors, for improving the accuracy of the results.

The measuring apparatus is particularly suitable for fuel flow rate measurements intended to the injection on a heat engine, including pressure ranges comprised between 0 and 3000 bars, and temperature ranges comprised between −30 and 140° C.

For this type of application comprising very short injection times, there is a need for a high sampling frequency to obtain an accurate measurement.

The invention claimed is:

1. A control method for an apparatus for ultrasonically measuring the flow rate of a fluid in a measuring channel, including a measuring channel whose one end is equipped with a first transducer and the other end is equipped with a second transducer, each transducer emitting ultrasonic waves to the other transducer, and receiving waves generated by the other transducer, wherein, in a first step, the first transducer emits waves to the second transducer, and in a second step, which can be simultaneous with the first one, the second transducer emits waves prior to the reception of the waves emitted by the first transducer.

2. The control method according to claim 1, wherein the first step and the second step are carried out iteratively.

3. The control method according to claim 1, wherein each transducer performs emissions of waves in a non-synchronized manner relative to the other transducer.

4. The control method according to claim 1, wherein each transducer performs emissions of waves in a synchronized manner relative to the other transducer.

5. A system for controlling an apparatus for ultrasonically measuring the flow rate of a fluid, comprising means implementing a control method according to claim 1.

6. The control system according to claim 5, further comprising a common energizing signal emission path for the two transducers.

7. The control system according to claim 5, further comprising an energizing signal emission path comprising a generator generating the energizing signals transmitted to an impedance matching circuit placed before or after a multiplexer connected to the transducers.

8. The control system according to claims 5, further comprising at least two separate reception paths.

9. The control system according to claim 8, wherein each reception path includes successively an impedance matching circuit, and then a signal conditioning device comprising a band-pass filter and an amplifier.

10. The control system according to claim 9, wherein each reception path includes a module for detecting the arrival of the wave delivering a processed signal, and then by a logic circuit validating the arrival time of the wave.

* * * * *